Nov. 14, 1961  K. H. HAASE  3,009,106
WAVE FORM ANALYZING METHOD AND APPARATUS
Filed Sept. 18, 1959  16 Sheets-Sheet 1

INVENTOR.
KURT H. HAASE
BY Wade Koontz and
Willard R. Matthews Jr.
ATTORNEYS

INVENTOR.
KURT H. HAASE

Nov. 14, 1961 K. H. HAASE 3,009,106
WAVE FORM ANALYZING METHOD AND APPARATUS
Filed Sept. 18, 1959 16 Sheets-Sheet 15

INVENTOR.
KURT H. HAASE
BY
Willard R. Matthews jr
ATTORNEYS

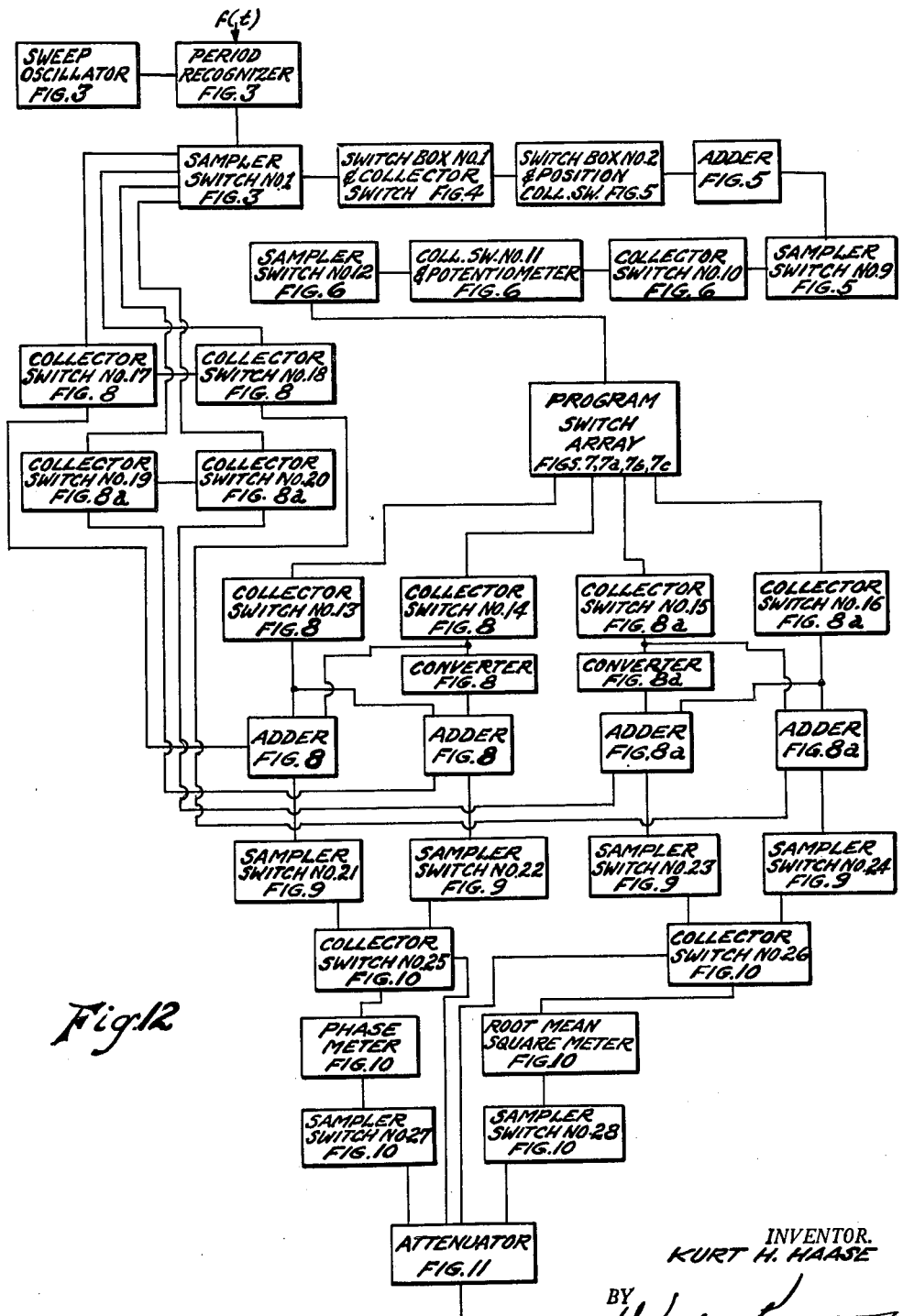

2,009,106
Patented Nov. 14, 1961

3,009,106
WAVE FORM ANALYZING METHOD AND APPARATUS
Kurt H. Haase, Watertown, Mass., assignor to the United States of America as represented by the Secretary of the Air Force
Filed Sept. 18, 1959, Ser. No. 840,981
12 Claims. (Cl. 324—77)
(Granted under Title 35, U.S. Code (1952), sec. 266)

The invention described herein may be manufactured and used by or for the United States Government for governmental purposes without payment to me of any royalty thereon.

This invention relates to analysis of electrical signals in accordance with their harmonic content and more particularly to a novel method and apparatus for obtaining any desired number of Fourier coefficients of the periodic functions which constitute a complex periodic wave.

It is well known that any periodic wave which is single valued and continuous may be represented by the sum of an infinite number of sine waves of different amplitudes and frequencies. This is represented by the following equation and is known as a Fourier series:

$$f(t) = A_{0/2} + \sum_{m=1}^{\infty} a_m \cos 2\pi mt + \sum_{m=1}^{\infty} b_m \sin 2\pi mt \quad (1)$$

where $$A_0 = 2\int_0^1 f(t)dt \quad (2)$$

$$a_m = 2\int_0^1 f(t) \cos 2\pi mt \, dt \quad (3)$$

$$b_m = 2\int_0^1 f(t) \sin 2\pi mt \, dt \quad (4)$$

It is therefore only necessary to obtain an adequate number of values for the coefficients $A_{0/2}$, $a_m$ and $b_m$ (known as Fourier coefficients) to provide an accurate expression for any non-sinusoidal periodic wave.

It is a common problem in the fields of engineering, applied physics and mathematics to obtain these coefficients and specifically the subject invention may be used in inter alia, investigations of speech sounds, X-ray examinations of the crystal structure of materials, the field of propagation, and seismic exploration and color matching through the medium of spectro-photometric curves.

Known methods of determining the equation of a complex wave include experimental observation, the use of oscillograms, the use of a comb filter to filter out the harmonic frequencies and the use of synthesizers which generate component waves and vary their phase, frequency and amplitude to simulate the wave to be analyzed.

These analyzing methods are limited to a finite number of coefficients or by the total bandwidths of filters and synthesizers.

The present invention avoids the aforementioned limitations of known Fourier analyzers by deriving, instead of the elementary natural coefficients defined by Fourier, periodic coefficients, each of which is multiplied by real number factors which are functions of the number of harmonic orders desired and the number of segments the wave has been divided into.

Accordingly, it is necessary to obtain only a certain limited number of periodic coefficients and to multiply these periodic coefficients by applicable real number factors to deliver any arbitrary number of natural Fourier coefficients.

It is therefore an object of this invention to teach a novel method of determining any desired number (without limit) of Fourier coefficients as the product of a periodic coefficient and applicable real number factors.

Another object of this invention is the provision of novel automatic wave form analyzing apparatus adapted to be utilized for the derivation of Fourier coefficients by the novel method herein described.

Another object of this invention is the provision of computer means which will carry out said method without being restricted to any fixed number of coefficients.

Another object of this invention is to provide a Fourier analyzer that is adjustable to the curve to be analyzed and will lend itself to derivation of any desired number of coefficients.

Another object of this invention is to provide a method for computing any desired number of Fourier coefficients for the purpose of programming with a conventional desk computer.

Another object of this invention is to provide automatic means for computing any number of Fourier coefficients for a non-sinusoidal periodic wave.

In general the novel Fourier analyzer to be described herein comprises: a period recognizer; a sampling device and storage means where an adequate number of samples of the wave to be analyzed are taken and stored to the end of the computation process; operational circuits to group said sample values according to their common harmonic order and multiply said groups by a number factor which is a function of the number of Fourier coefficients desired; and attenuators to derive the natural coefficients from the said periodic coefficients.

The novel features which I believe to be characteristic of my invention are set forth with particularity in the appended claims. My invention itself, however, together with further objects and advantages thereof can best be understood by reference to the following description taken in connection with the accompanying drawings, in which:

FIGURE 12 illustrates a block diagram of the component parts of the invention.

Figure 1:
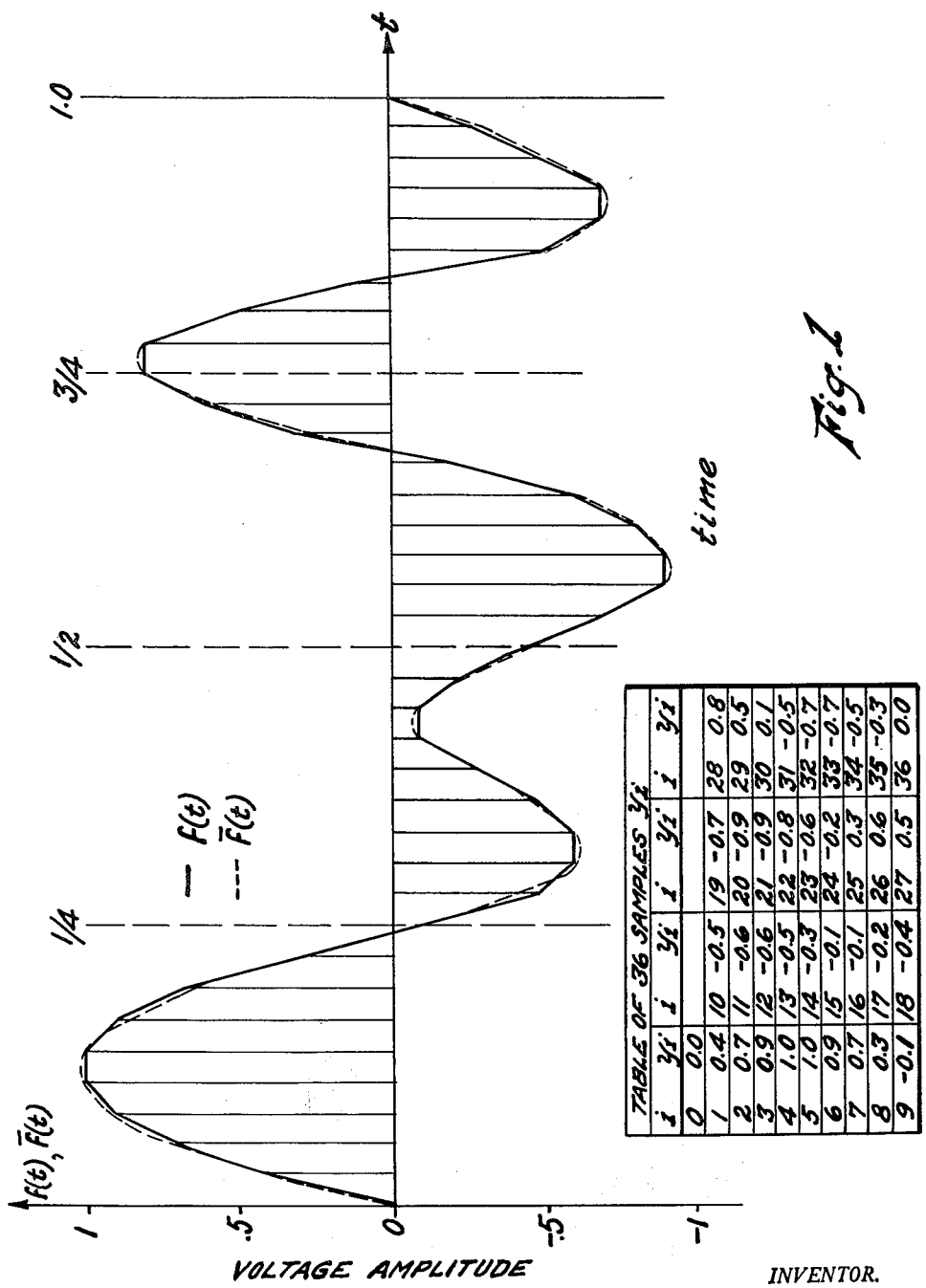
FIGURE 1 illustrates a typical periodic non-sinusoidal wave and its approximate equivalent consisting of a polygonial sequence of straight lines.

Referring now to FIGURE 1 the period of a function $\bar{f}(t)$ (dotted) which is in sufficient correspondence with the polygonial sequence of straight lines $f(t)$ (solid lines) is shown to be divided into an integral number of segments in the $t$ (time) direction. If a periodic function $f(t)$ is approximated by a polygonial trace of straight lines, then the Fourier coefficients $a_m$ and $b_m$ are approximately the same for $f(t)$ and for its approximation. I have found that if the corners of the polygon trace are equidistant in the direction of the $t$-axis, so that the interval of the period is divided into $n$ equal sections, then the coefficients can be written as products.

$$a_m = K_n C_m a_m^* \tag{5}$$

$$b_m = K_n C_m b_m^* \tag{6}$$

where $K_n$ is defined as a number factor dependent upon the number of equal timewise segments $f(t)$ has been divided into, $C_m$ is a number factor which is tabulated for any harmonic order $m$ as illustrated in Table I; and $a_m^*$ and $b_m^*$ represent groupwise intercorrelated periodic coefficients. These parameters are further defined by the following equations and table:

$$K_n = \frac{\sin \pi/4N}{\pi}\sqrt{8N} \tag{7}$$

$$C_m = \frac{\sin \pi m/4N}{m \cdot \sin \pi/4N} \tag{8}$$

$$a_m^* = \sum_{i=1}^{i=4N} y_i \cos\left(\frac{\pi m}{2N}i\right) \tag{9}$$

$$b_m^* = \sum_{i=1}^{i=4N} y_i \sin\left(\frac{\pi m}{2N}i\right) \tag{10}$$

Table of factors $C_m^2$ for parameter $N=9$

| $m$ | $C_m^2$ | $m$ | $C_m^2$ | $m$ | $C_m^2$ | $m$ | $C_m^2$ |
|---|---|---|---|---|---|---|---|
| 0 |  | 20 | 0. 319 189 | 40 | 0.0²962 473 | 60 | 0.0274 261 |
| 1 | 1.000 000 | 21 | . 278 519 | 41 | 0.0139 873 | 61 | 237 397 |
| 2 | 0.992 396 | 22 | . 240 177 | 42 | 186 572 | 62 | 200 969 |
| 3 | .979 840 | 23 | . 204 410 | 43 | 234 234 | 63 | 165 842 |
| 4 | .962 473 | 24 | . 171 413 | 44 | 280 954 | 64 | 132 795 |
| 5 | 0.940 506 | 25 | 0. 141 337 | 45 | 0.0325 050 | 65 | 0.0102 509 |
| 6 | .914 204 | 26 | . 114 279 | 46 | 365 088 | 66 | 0.0²755 540 |
| 7 | .883 876 | 27 | 0.0902 918 | 47 | 399 888 | 67 | 523 783 |
| 8 | .849 887 | 28 | . 693 785 | 48 | 428 533 | 68 | 333 036 |
| 9 | .812 626 | 29 | 514 981 | 49 | 450 365 | 69 | 185 225 |
| 10 | 0.772 526 | 30 | 0.0365 681 | 50 | 0.0464 983 | 70 | 0.0³810 119 |
| 11 | .730 044 | 31 | 244 668 | 51 | 472 229 | 71 | 198 373 |
| 12 | .685 652 | 32 | 150 386 | 52 | 472 174 | 72 | 0.00000 000 |
| 13 | .639 838 | 33 | 0.0²809 785 | 53 | 465 096 | 73 | 0.0³187 652 |
| 14 | .593 091 | 34 | 343 390 | 54 | 451 459 | 74 | 724 906 |
| 15 | 0.545 897 | 35 | 0.0³816 327 | 55 | 0.0431 886 | 75 | 0.0²156 774 |
| 16 | .498 734 | 36 | 0.00000 000 | 56 | 407 129 | 76 | 266 613 |
| 17 | .452 060 | 37 | 0.0³703 586 | 57 | 378 045 | 77 | 396 570 |
| 18 | .406 313 | 38 | 0.0²274 902 | 58 | 345 558 | 78 | 540 949 |
| 19 | .361 899 | 39 | 579 787 | 59 | 310 637 | 79 | 693 958 |
| 20 | 0.319 189 | 40 | 0.0²962 473 | 60 | 0.0274 261 | 80 | 0.0²849 887 |

I have discovered, and it is fundamental to my invention, that periodic coefficients $a_m^*$ and $b_m^*$ are, under certain conditions, common parameters of intercorrelated groups of periodic functions which constitute the wave to be analyzed. More specifically I have found that in a periodic wave which has been segregated into $n$ timewise equidistant segments, as illustrated in FIGURE 1, the periodic coefficients for intercorrelated groups of periodic functions are identical at points $i$, $\pi-i$, $\pi+i$ and $2\pi-i$. This is true also of periodic coefficients at points $2i$, $\pi-2i$, $\pi+2i$ and $2\pi-2i$ and for other intercorrelated groups up to $N-i$. Therefore, to solve for any number of Fourier coefficients it is only necessary to obtain $n$ sample $y$ values of the wave to be analyzed, group said sample $y$ values as indicated and multiply the groups by the number factors $K_n$ and $C_m$. To facilitate grouping of values, the following equations have been formulated in which the notations involving group summations have a systematic background in the choice of capital letters and indices thereby making their distinction easy. Coefficients, and related functions thereof, associated with said intercorrelated groups of periodic functions are designated by an asterisk (*), said asterisk being a general symbol intended to differentiate the periodic functions comprehended by my invention from the so-called natural Fourier functions. N is an integer defined as $$N = \frac{n}{4}$$

Capital letters H and F are summations of 4 distinct sample values $y_1$, $\pm y_{2n-1}$, $\pm y_{n+1}$, and $\pm y_{n-1}$. Capital H is correlated to even indexed coefficients $a_{2\mu}^*$, capital F to odd indexed coefficients $$a_{2\mu+1}^*$$

According to indices $2i$ or $2i-1$ H and F makes a choice between group summations beginning with even or odd numbered samples $y_{2i}$ or $y_{2i-1}$. For computation of $b_m^*$ coefficients these capitals are marked by a bar. Capital letter G is used in summations involving even indices $2i$ in H and F as well as in the trigonometric function. Capital letter U is used where $2i-1$ appears instead of $2i$. The indices of G and U may be, corresponding to $m$, $2\mu$ or $2\mu+1$. Again barred capitals $\bar{G}$ and $\bar{U}$ are used for computation formulas for $b_m^*$ coefficients.

$$F_1 = (y_1 + y_{4N-1}) - (y_{2N-1} + y_{2N+1}) \tag{11}$$

$$H_1 = (y_1 + y_{4N-1}) + (y_{2N-1} + y_{2N+1}) \tag{12}$$

$$\bar{F}_1 = (y_1 - y_{4N-1}) + (y_{2N-1} - y_{2N+1}) \tag{13}$$

$$\bar{H}_1 = (y_1 - y_{4N-1}) - (y_{2N-1} - y_{2N+1}) \tag{14}$$

Using $H_i$ defined in (12) we get $$a_0 = \frac{1}{2N}(y_N + y_{3N}) + y_{2N}$$

$$+ \sum_{i=1}^{\gamma-1}[H_{2i-1} + H_{2i}] \text{ if } N \text{ odd} = 2\gamma - 1 \tag{14a}$$

$$a_0 = \frac{1}{2N}\bigg[(y_N + y_{3N}) + y_{2N}$$

$$+ \sum_{i=1}^{\gamma} H_{2i-1} + \sum_{i=1}^{\gamma-1} H_{2i}\bigg] \text{ if } N \text{ even} = 2\gamma \tag{14b}$$

It can be shown that if $1 \leq m \leq (N-1)$ $$a_m^* = a_{4N-m}^* \tag{15}$$

$$a_{2N-m}^* = a_{2N+m}^* \tag{15a}$$

$$b_m^* = -b_{4N-m}^* \tag{16}$$

$$b_{2N-m}^* = -b_{2N+m}^* \tag{16a}$$

Introducing the sums defined in (11) ... (14) into

Equations 9 and 10 we define now two subgroups of sums, namely

Sub sums $G_m$ where only even indexed sums $F_{2i}$, $H_{2i}$, $\overline{F}_{2i}$ and $\overline{H}_{2i}$ are included and Sub sums $U_m$ where only odd indexed sums $F_{2i-1}$, $H_{2i-1}$, $\overline{F}_{2i-1}$ and $\overline{H}_{2i-1}$ are included.

Furthermore we discriminate between even indices $m_e = 2\mu$ and odd indices $m_0 = 2\mu - 1$.

So, we define, if $\overline{\text{N odd}=2\gamma-1}$ $$G_{2\mu-1} = \sum_{i=1}^{\gamma-1} F_{2i} \cos \frac{\pi(2\mu-1).2i}{2N} \qquad 1 \leq \mu \leq \gamma \quad (17)$$

$$G_{2\mu} = \sum_{i=1}^{\gamma-1} H_{2i} \cos \frac{\pi.2\mu 2i}{2N} \qquad 0 \leq \mu \leq (\gamma-1)\ G_0 = \sum_{i=1}^{\gamma-1} H_{2i} \quad (17a)$$

$$U_{2\mu-1} = \sum_{i=1}^{\gamma-1} F_{2i-1} \cos \frac{\pi(2\mu-1)(2i-1)}{2N} \qquad 1 \leq \mu \leq \gamma\ U_{2\gamma-1}=0 \quad (17b)$$

$$U_{2\mu} = \sum_{i=1}^{\gamma-1} H_{2i-1} \cos \frac{\pi.2\mu.(2i-1)}{2N}$$

$$0 \leq \mu \leq (\gamma-1)\ U_0 = \sum_{i=1}^{\gamma-1} H_{2i-1} \quad (17c)$$

$$\overline{G}_{2\mu-1} = \sum_{i=1}^{\gamma-1} \overline{F}_{2i} \sin \frac{\pi(2\mu-1).2i}{2N} \qquad 1 \leq \mu \leq \gamma\ \overline{G}_{2\gamma-1}=0 \quad (17d)$$

$$\overline{G}_{2\mu} = \sum_{i=1}^{\gamma-1} \overline{H}_{2i} \sin \frac{\pi.2\mu.2i}{2N} \qquad 1 \leq \mu \leq (\gamma-1) \quad (17e)$$

$$\overline{U}_{2\mu-1} = \sum_{i=1}^{\gamma-1} \overline{F}_{2i-1} \sin \frac{\pi(2\mu-1)(2i-1)}{2N} \qquad 1 \leq \mu \leq (\gamma-1) \quad (17f)$$

$$\overline{U}_{2\mu} = \sum_{i=1}^{\gamma-1} \overline{H}_{2i-1} \sin \frac{\pi.2\mu.(2i-1)}{2N} \qquad 1 \leq \mu \leq (\gamma-1) \quad (17g)$$

If N even $=2\gamma$ we define $$G_{2\mu-1} = \sum_{i=1}^{\gamma-1} F_{2i} \cos \frac{\pi(2\mu-1).2i}{2N} \qquad 1 \leq \mu \leq \gamma \quad (18)$$

$$G_{2\mu} = \sum_{i=1}^{\gamma-1} H_{2i} \cos \frac{\pi.2\mu 2i}{2N} \qquad 0 \leq \mu \leq \gamma\ G_0 = \sum_{i=1}^{i=\gamma-1} H_{2i} \quad (18a)$$

$$H_{2\mu-1} = \sum_{i=1}^{\gamma} F_{2i-1} \cos \frac{\pi(2\mu-1)(2i-1)}{2N} \qquad 1 \leq \mu \leq \gamma \quad (18b)$$

$$U_{2\mu} = \sum_{i=1}^{\gamma} H_{2i-1} \cos \frac{\pi.2\mu(2i-1)}{2N}$$

$$0 \leq \mu \leq \gamma\ U_0 = \sum_{i=1}^{i=\gamma} H_{2i-1} \quad (18c)$$

$$\overline{G}_{2\mu-1} = \sum_{i=1}^{\gamma-1} \overline{F}_{2i} \sin \frac{\pi(2\mu-1).2i}{2N} \qquad 1 \leq \mu \leq \gamma \quad (18d)$$

$$\overline{G}_{2\mu} = \sum_{i=1}^{\gamma-1} \overline{H}_{2i} \sin \frac{\pi.2\mu 2i}{2N} \qquad 1 \leq \mu \leq \overline{G}_{2\gamma}=0 \quad (18e)$$

$$\overline{U}_{2\mu-1} = \sum_{i=1}^{\gamma} \overline{F}_{2i-1} \sin \frac{\pi(2\mu-1)(2i-1)}{2N} \qquad 1 \leq \mu \leq \gamma \quad (18f)$$

$$\overline{U}_{2\mu} = \sum_{i=1}^{\gamma} \overline{H}_{2i-1} \sin \frac{\pi.2\mu(2i-1)}{2N} \qquad 1 \leq \mu \leq \gamma \quad (18g)$$

Substituting the subsums $G_m$ and $U_m$ into Equations 9 and 10 we get $$a^*_{2\mu-1} = a^*_{4N-(2\mu-1)} = -y_{2N} + (G_{2\mu-1} + U_{2\mu-1}) \quad (19)$$

$$a^*_{2\mu} = a^*_{4N-2\mu} = (y_N + y_{3N})(-1)^\mu + y_{2N} + (G_{2\mu} + U_{2\mu}) \quad (19a)$$

$$a^*_{2N-(2\mu-1)} = a^*_{2N+(2\mu-1)} = -y_{2N} + (G_{2\mu-1} - U_{2\mu-1}) \quad (19b)$$

$$b^*_{2\mu-1} = -b^*_{4N-(2\mu-1)} = -(y_N - y_{3N})(-1)^\mu + (\overline{U}_{2\mu-1} + \overline{G}_{2\mu-1}) \quad (19c)$$

$$b^*_{2\mu} = -b^*_{4N-2\mu} = (\overline{U}_{2\mu} + \overline{G}_{2\mu}) \quad (19d)$$

$$b^*_{2N-2\mu} = -b^*_{2N+2\mu} = (\overline{U}_{2\mu} - \overline{G}_{2\mu}) \quad (19e)$$

and if $\overline{\text{N odd}=2\gamma-1}$ $$a^*_{2N-2\mu} = a^*_{2N+2\mu} = -(y_N + y_{3N})(-1)^\mu + y_{2N} + (G_{2\mu} - U_{2\mu}) \quad (20)$$

$$b^*_{2N-(2\mu-1)} = -b^*_{2N+(2\mu-1)}$$
$$= -(y_N - y_{3N})(-1)^\mu + (\overline{U}_{2\mu-1} - \overline{G}_{2\mu-1}) \quad (20a)$$

and if $\overline{\text{N even}=2\gamma}$ $$a^*_{2N-2\mu} = a^*_{2N+2\mu} = (y_N + y_{3N})(-1)^\mu + y_{2N} + (G_{2\mu} - U_{2\mu}) \quad (21)$$

$$b^*_{2N-(2\mu-1)} = -b^*_{2N+(2\mu-1)} = (y_N - y_{3N})(-1)^\mu$$
$$- (\overline{U}_{2\mu-1} - \overline{G}_{2\mu-1}) \quad (21a)$$

By Equations 19, 20 and 21 all periodic coefficients are known.

As it has been already stated, Fourier analysis can be carried out by using any number of timewise equidistant samples within one period of the periodic function to be analyzed. To use $n=4N$ samples where N is an integer has practical advantages. For the design outlined in the following paragraphs $n$ is assumed to be 36 and N consequently equals 9.

Based on theory and example the Fourier analyzer has 3 parts:

Part 1 comprehends a Period Recognizer and a Storage Device where each of the 36 samples on FIG. 1 ($y_0=0$, $y_1$, $y_2$ ... $y_{35}$, $y_{36}=0$) is stored up to the end of the computation process.

Part 2 comprehends all the Operational Circuits to compute the periodic coefficients. The operations involved are sampling and collecting of values derived from the sample values $y_0$ ... $y_{36}$, additions and polarity conversions and finally multiplications of sampled or derived values by real values $\leq 1$.

Part 3 comprehends attenuators to derive the natural coefficients from the periodic ones.

Naturally many variations in the performance of the computation process are possible. For instance an addition of values can be carried out simultaneously or in time sequence. Switching devices can be combined to minimize the display of circuitry. So the description of the apparatus has to be taken as one example to perform the general principle based on what is described in the paragraph theory.

Figure 2:
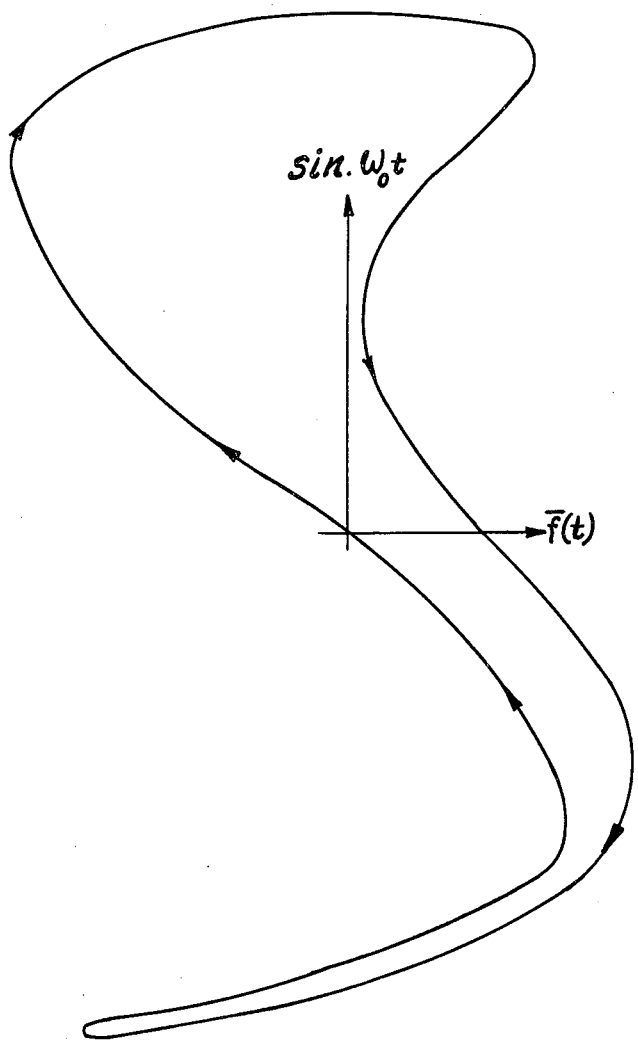
FIGURE 2 illustrates a typical continuous oscilloscope trace such as is produced in the period recognition of a non-sinusoidal wave.
Figure 3:
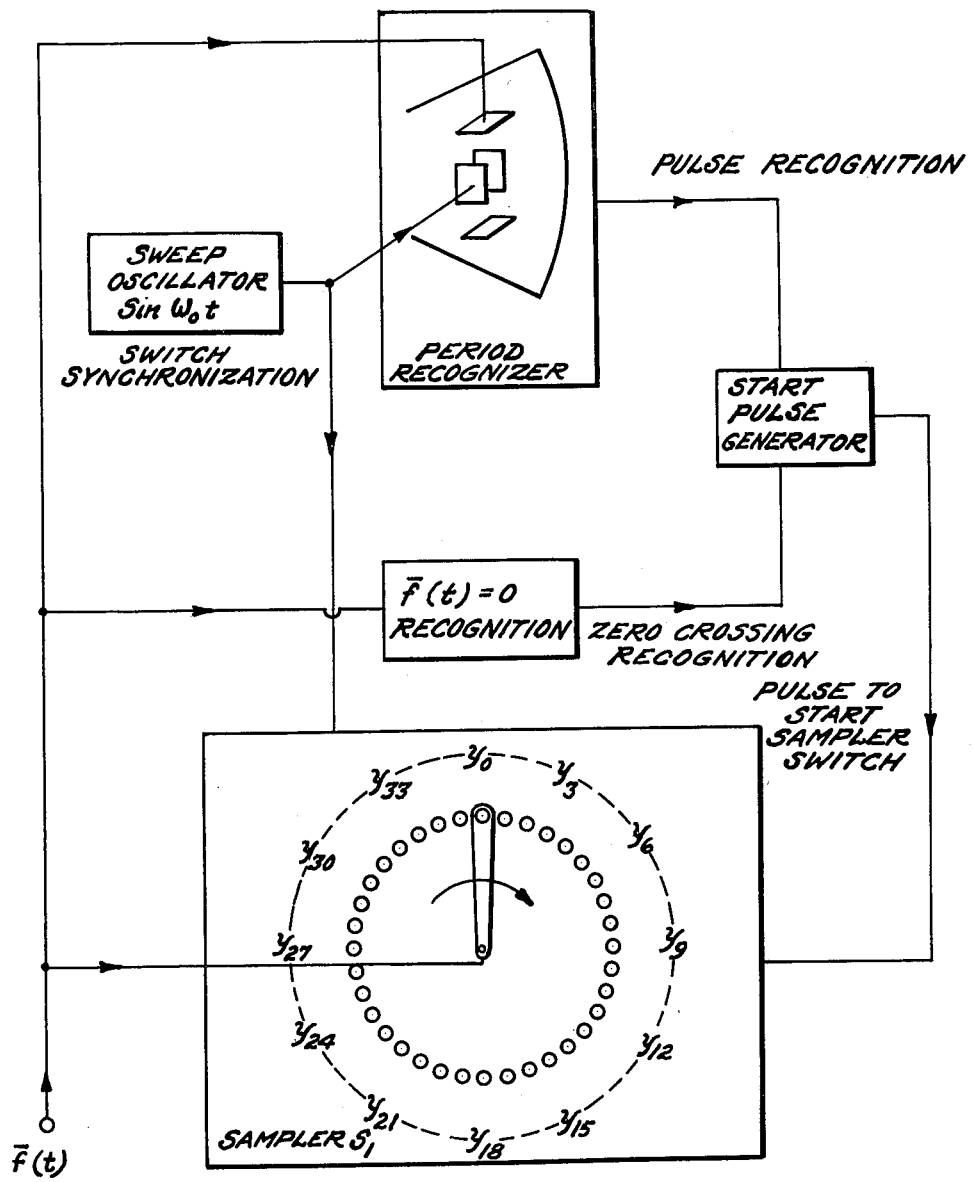
FIGURE 3 illustrates the period recognizing stage and sampler switch of one embodiment of my invention.

As far as switching devices are used they are represented as mechanical rotary switches with one rotation arm resting on concentrically arranged contacts. They can always be replaced by suitable electronic switching circuits. Additions are made on the basis of simultaneity. The values in operation may be continuous, quantized or digitized. No attempt is made to achieve minimization. If the period of $\bar{f}(t)$ (as defined in Equation 1) is not known, it can be recognized by a Lissajous figure written on the screen of an oscilloscope. As shown in the block diagram of FIG. 3 a sine wave sweep oscillator covering a frequency range in which the fundamental frequency $1/T$ of $\bar{f}(t)$ can be expected, is linked to the y-plates of an oscilloscope. The function $\bar{f}(t)$ to be investigated is linged to the x-plates. By sweeping the oscillator frequency a steady picture will be received on the screen if one of both frequencies (oscillator frequency and frequency of $\bar{f}(t)$) is an integer multiple of the other. If the oscillator frequency is identical to $1/T$, the picture will be a closed loop without crossings as shown in FIG. 2 using $\bar{f}(t)$ in FIG. 1. In case of multiples, loop crossings will appear. As soon as a picture as shown in FIG. 2 will appear, the instantaneous sweep frequency of the sweep oscillator represents the desired fundamental frequency of $\bar{f}(t)$. As shown in the example in FIG. 1 subsequent zero crossings are not apt to derive the fundamental frequency. But since a group of zero crossings is in periodic repetition, the computation process can be started with any zero crossing of $\bar{f}(t)$. To start with a zero crossing is convenient but no necessity. The start pulse to begin the computation by sampling the values $y_0 \ldots y_{36}$ is given by the first zero crossing after the frequency recognition. This means that the Sampler Switch $S_1$ in FIG. 3 starts and within the time T of one period it samples the values $y_0 \ldots y_{35}$ and stores them on its contacts. Only one revolution of the switch is necessary. This is important in so far as the duration of the existence of the periodic function $\bar{f}(t)$ may be short (as in the case of vowel analysis in speech for instance).

As the next step the operations given by Equations 11 ... 14 have to be performed.

Figure 4:
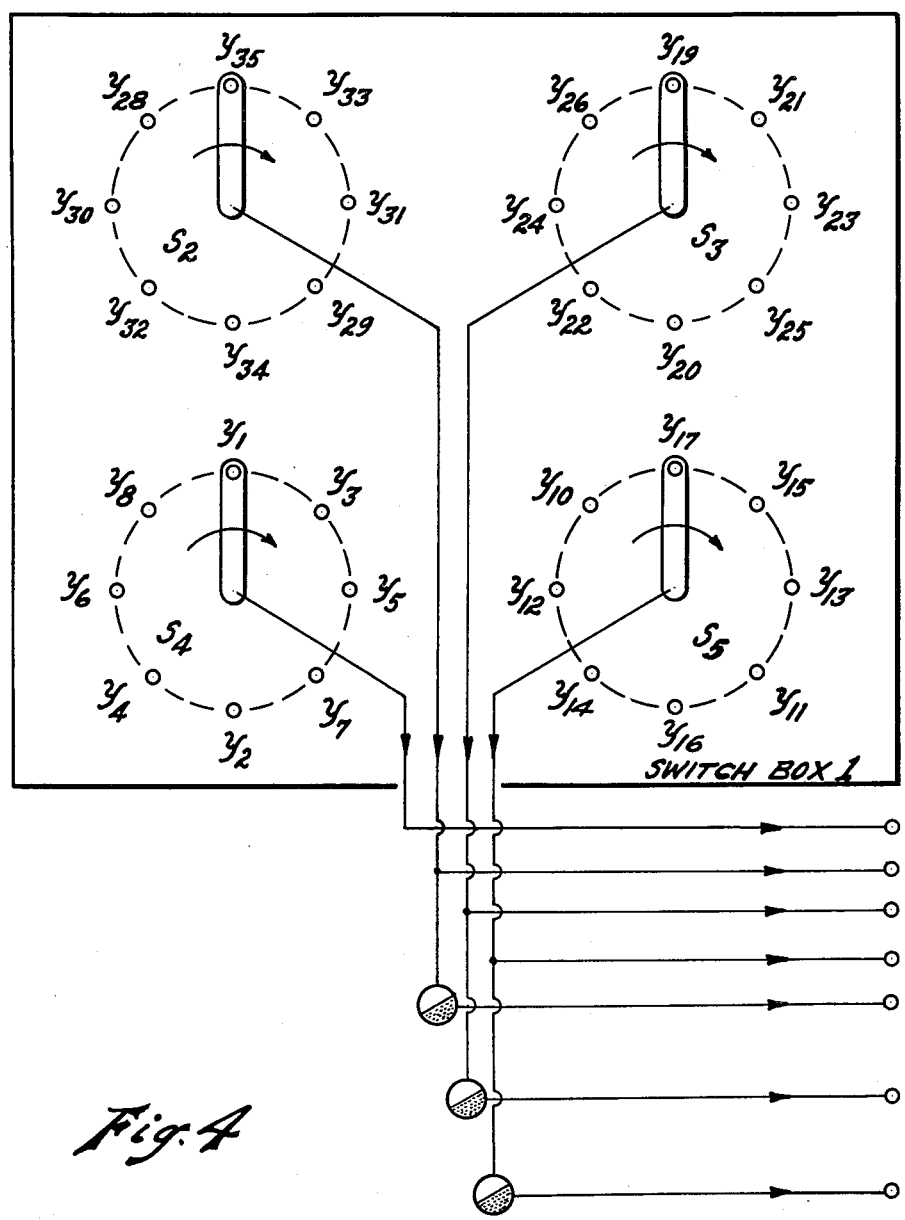
FIGURE 4 illustrates collector switches and phase converters of the first grouping stage of the invention.

There is a Switch Box 1 shown in FIG. 4 containing 4 collector switches $S_2$, $S_3$, $S_4$ and $S_5$. Each collector switch has 8 contacts connected with the corresponding contacts on sampler switch $S_1$ in FIG. 3. Each switch is connected to contacts 1 ... 4, switch $S_2$, $S_3$ and $S_5$ in parallel to a converter each and then to contacts 2', 3' and 4'.

Figure 5:
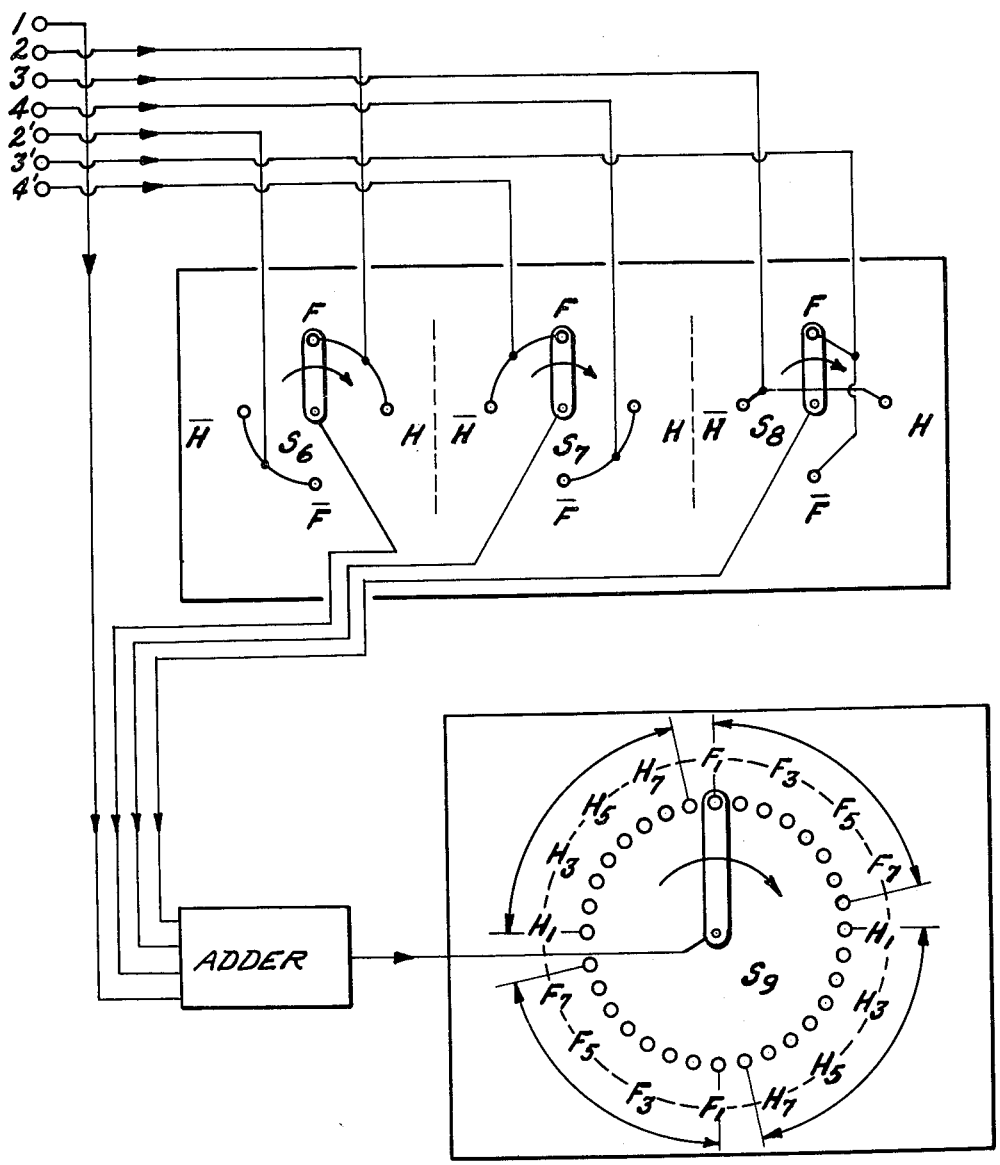
FIGURE 5 illustrates adder means and sampler switches of the first grouping stage of the invention.

The contacts 1 ... 4 and 2' ... 4' are repeated on FIG. 5. This figure shows a Switch Box 2 containing 4 position collector switches $S_6$, $S_7$ and $S_8$. The positions are marked by F, H, $\bar{F}$ and $\bar{H}$. Each collector switch is connected to and Adder apt to add 4 simultaneous values. Its output is connected to Sampler Switch $S_9$ with $4 \times 8 = 32$ positions or contact.

Assume $S_6$, $S_7$ and $S_8$ in position "F." During one revolution of switches $S_2 \ldots S_5$, the adder gets to its input exactly the 4 elements in Equation 11 while $i$ runs from 1 to 8. The sums will be stored on contacts $F_1 \ldots F_8$ by switch $S_9$ which makes in the same time a quarter revolution. Naturally $S_2 \ldots S_5$ and $S_6 \ldots S_8$ always have to be interphased and synchronous. For the next revolution of $S_2 \ldots S_5$ and the next quarter revolution of $S_9$ switches $S_6 \ldots S_8$ go into position "H" and Equation 12 is performed. Similarly Equations 13 and 14 will be performed in positions $\bar{F}$ and $\bar{H}$ of $S_6 \ldots S_8$. So, in 4 revolutions of $S_2 \ldots S_5$, 4 positions of $S_6 \ldots S_8$ and one revolution of $S_9$ all sums given by Equations 11 ... 14 will be stored on the contacts of $S_9$.

Figure 6:
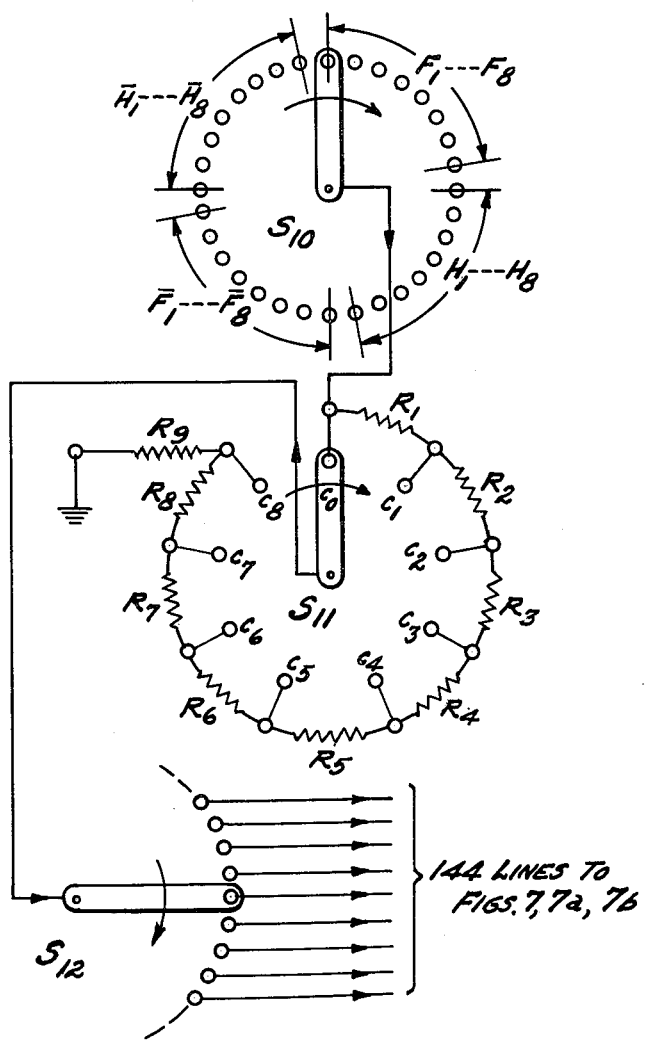
FIGURE 6 illustrates the multiplier stage of the invention.
Figure 7:
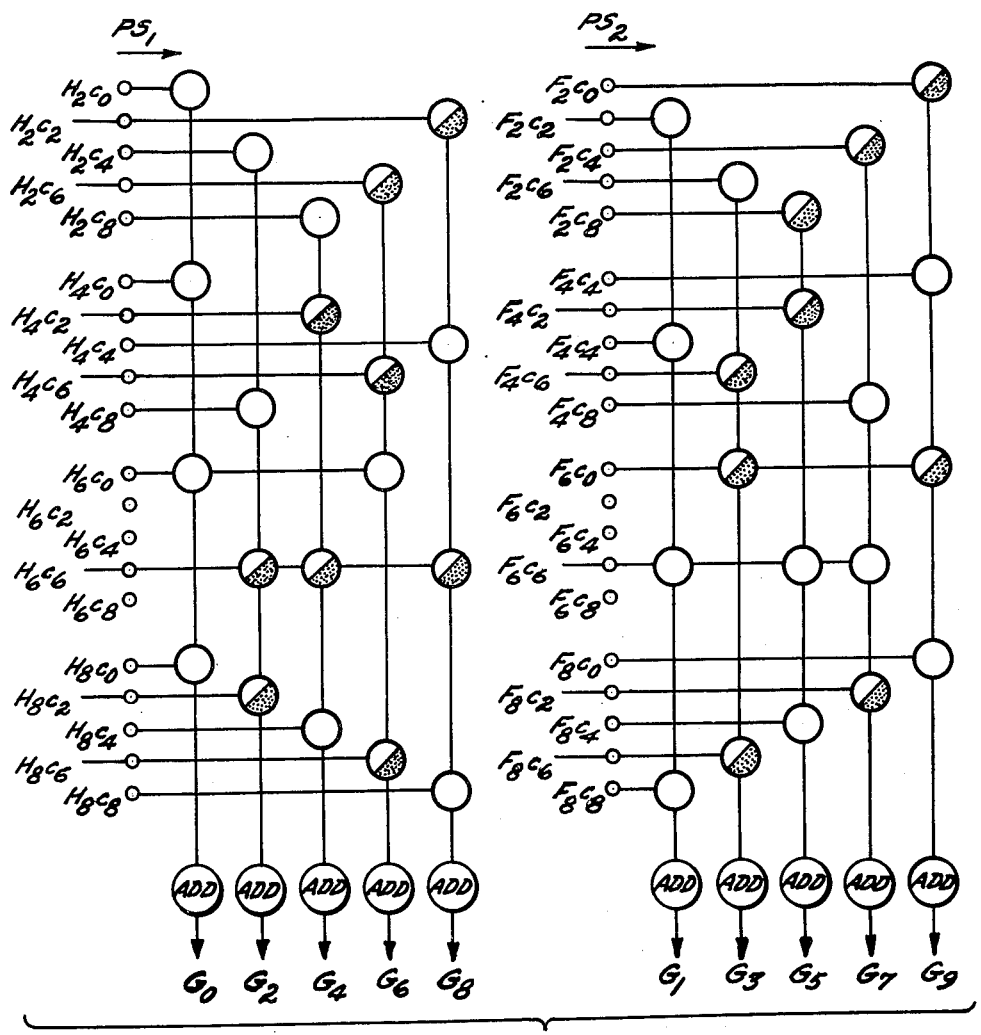
FIGURES 7, 7a, 7b and 7c illustrate the program switch array of the second grouping stage of the invention.
Figure 7A:
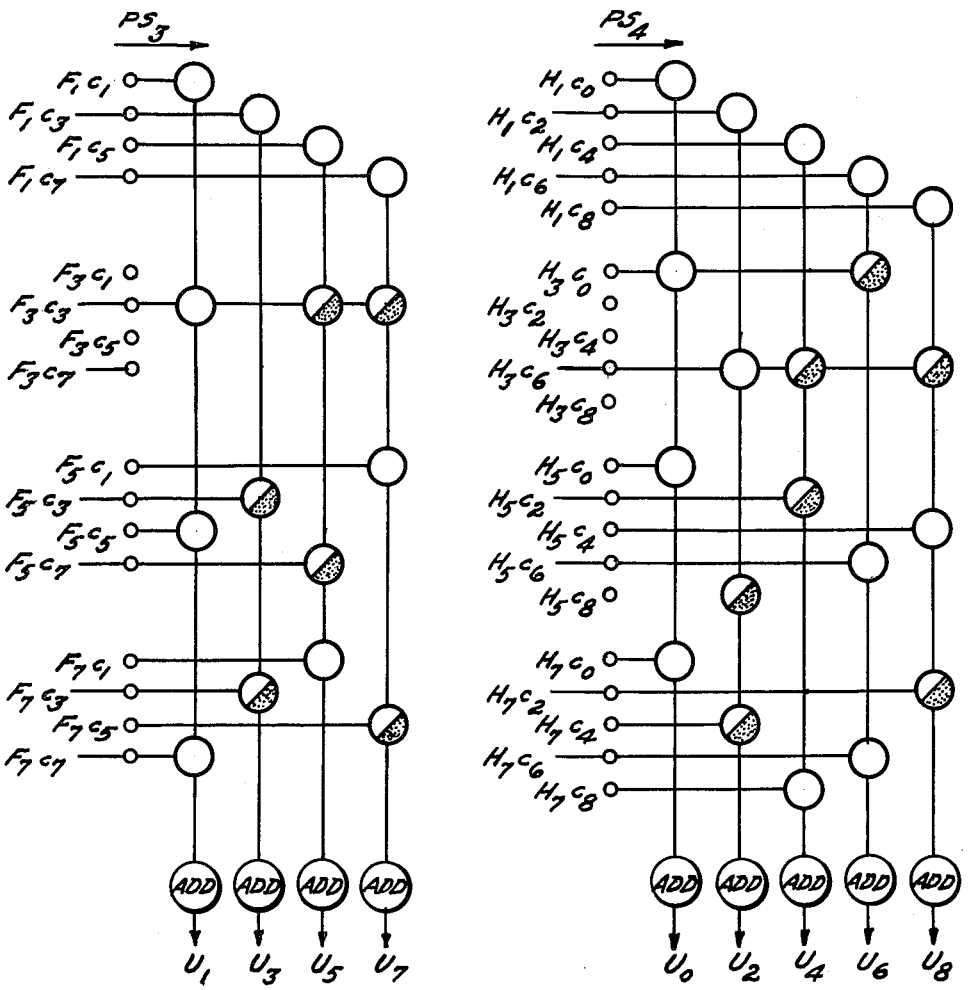
Figure 7B:
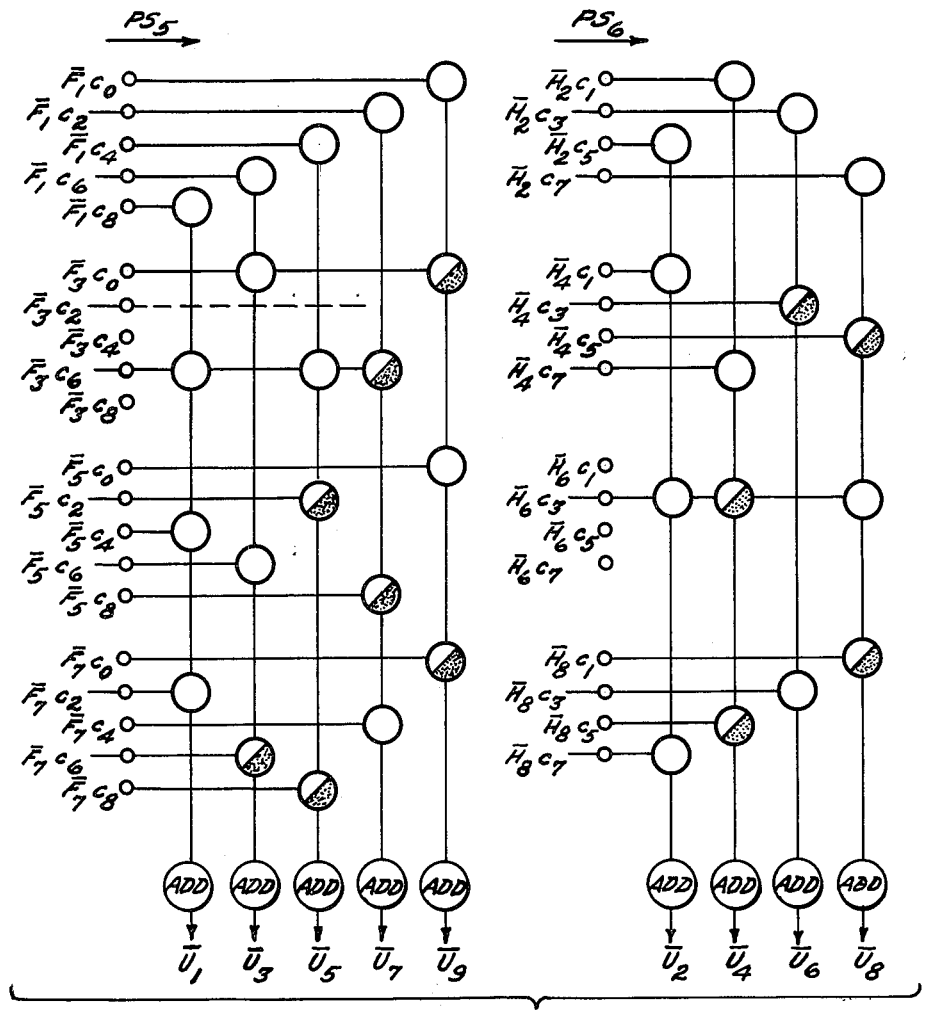
Figure 7C:
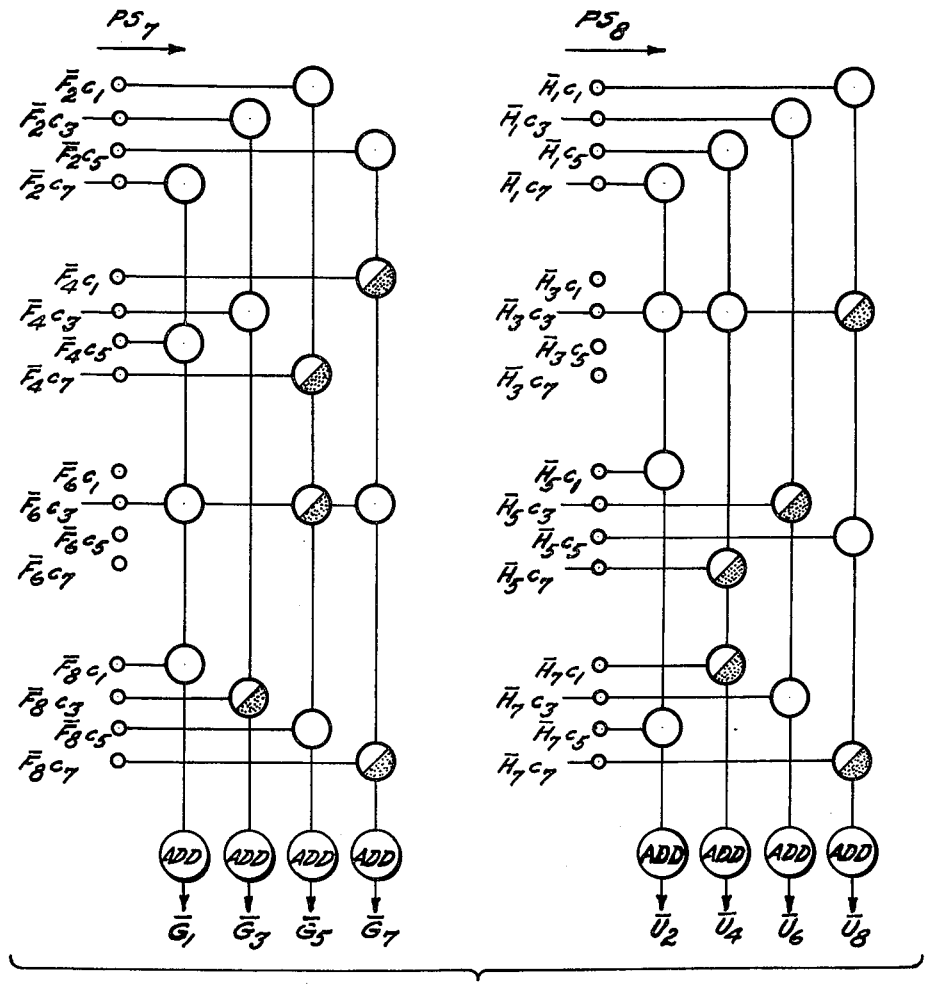
Figure 8:
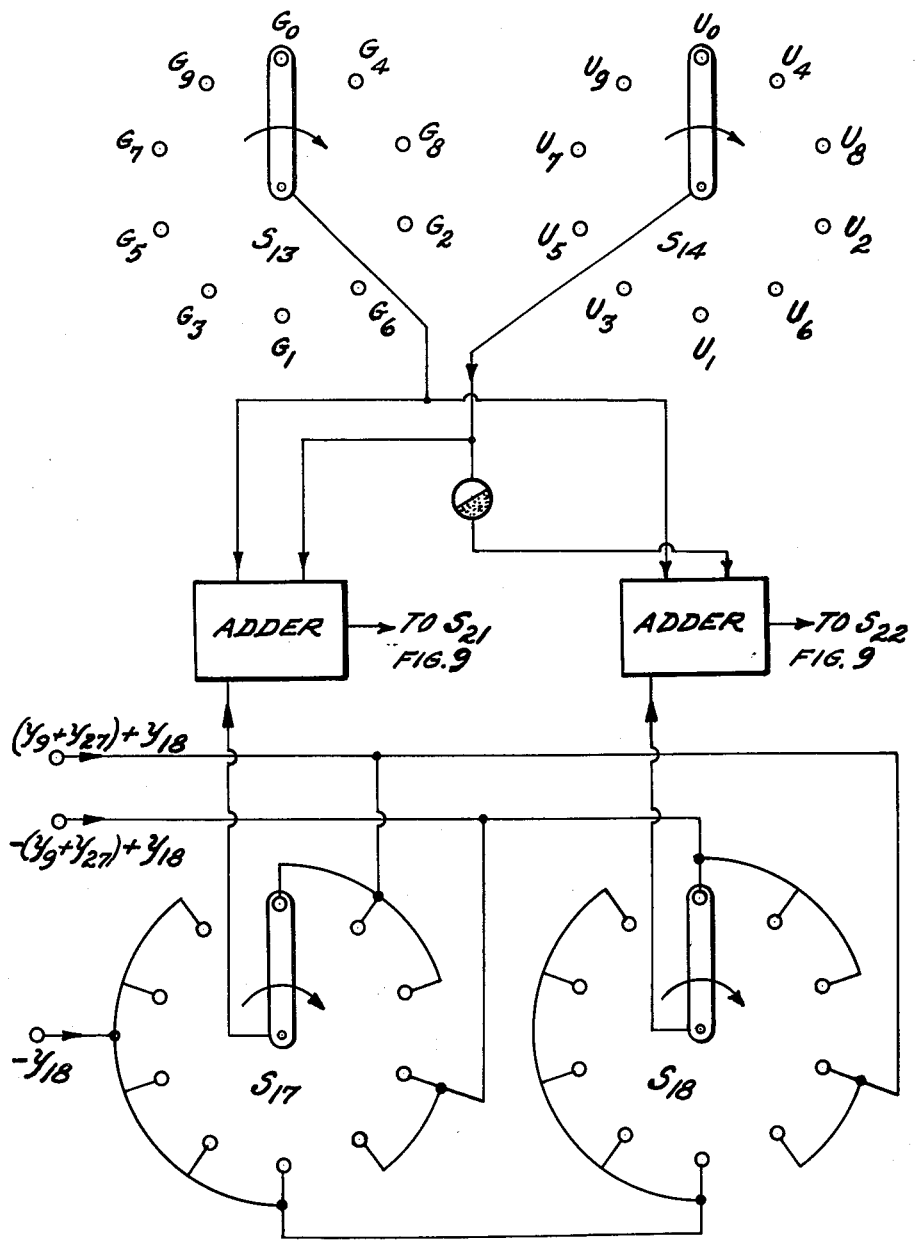
FIGURES 8 and 8a illustrate the sampler switches, phase converters and adder means of the second grouping stage of the invention.
Figure 8A:
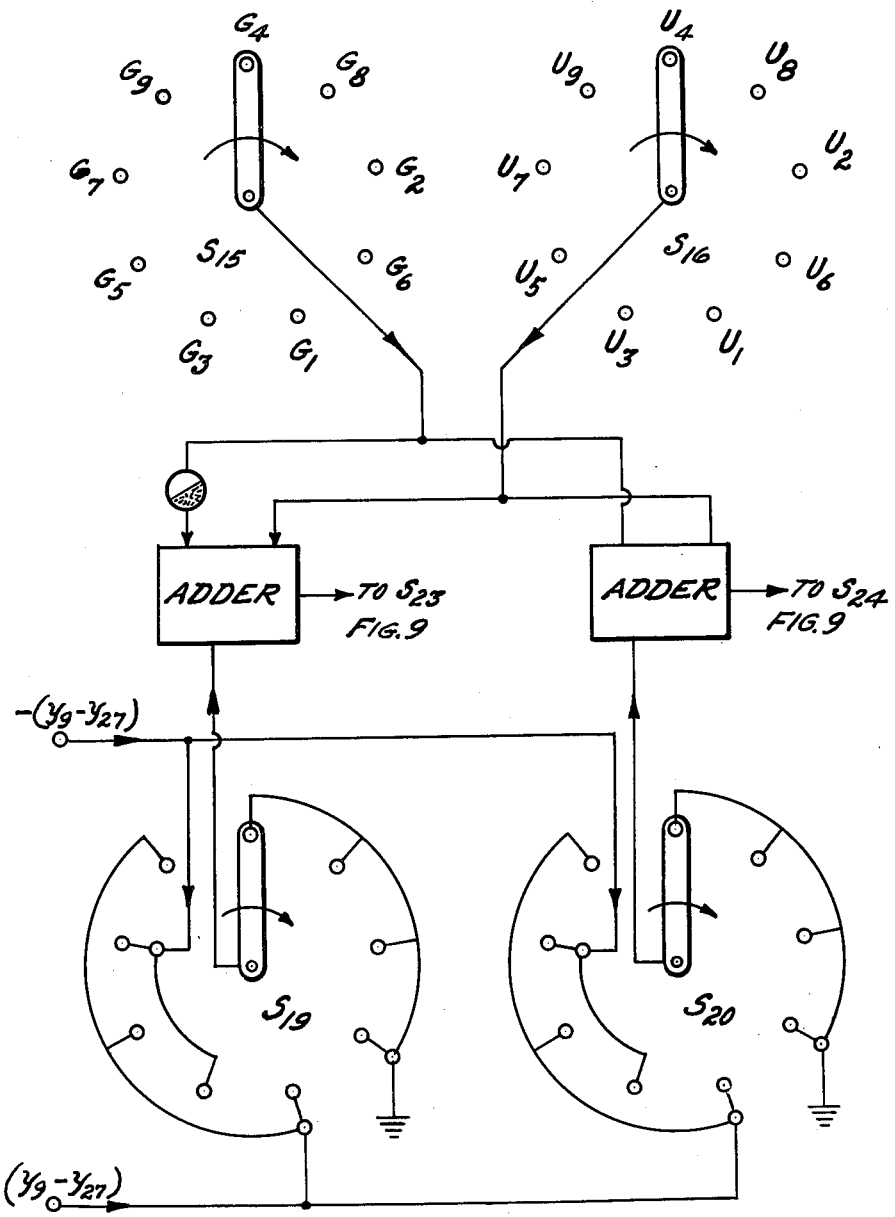
Figure 9:
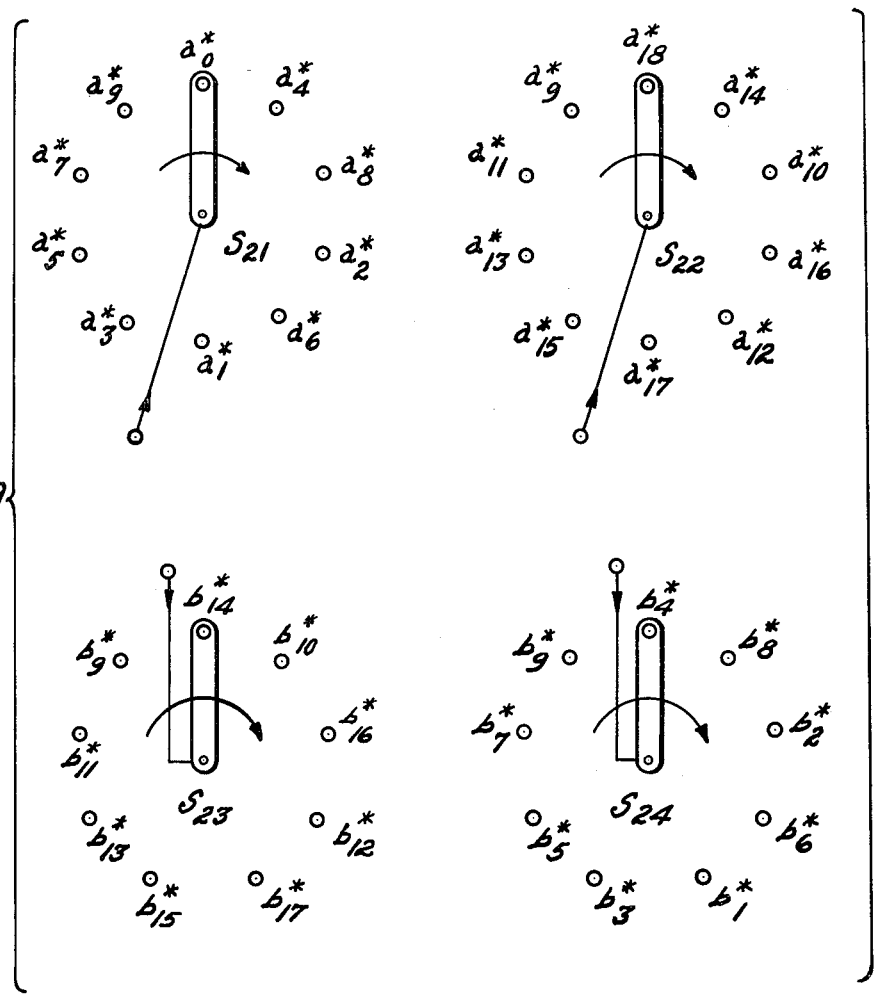
FIGURE 9 illustrates the collector switches of the second grouping stage of the invention.
Figure 10:
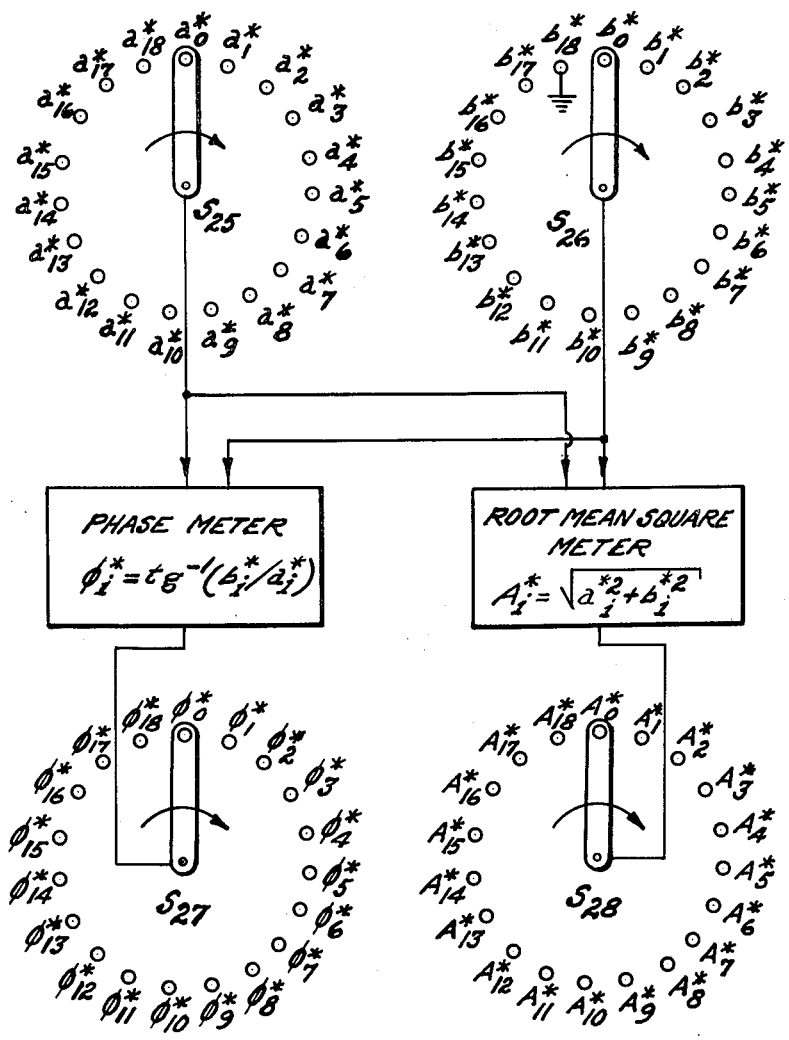
FIGURE 10 illustrates the phase meter and root mean square meter stage of the invention.

Now we have to build the sums written down in Equations 17, 17a, 17b, 17c, 17d, 17e, 17f and 17g. This means that we have to multiply at first the already stored values $F_1$, $H_1$, $\bar{F}_1$ and $\bar{H}_1$ by the real coefficients $c_0=1$, $c_1 \ldots c_8$ enumerated in table. Since the coefficients $c_1 \ldots c_8$ are numbers smaller than 1, the multiplication can be performed by a potentiometer with tap ratios corresponding to the coefficients $c_1 \ldots c_8$ while $c_0=1$ is the value itself. On FIG. 6 we find a collector switch $S_{10}$ with contacts parallel to those of $S_9$ connected to another collector switch $S_{11}$ where the contacts are interconnected by resistors $R_1 \ldots R_8$ and the last contact is linked to ground $(=0)$ over resistor $R_9$. Let $S_{10}$ for instance be in position $F_1$ while $S_{11}$ makes one revolution, $S_{11}$ delivers in time sequence all products $F_1.1 \ldots F_1 c_8$. If so $S_{10}$ keeps each position for the duration of one revolution of $S_{11}$, sampler switch $S_{12}$ receives 288 products. Of these products only 144 are used which is a consequence of the fact that for instance no combination of even indexed $F_{2i}$ with odd indexed $c_{2l+1}$ is used. 144 sample values are selected by $S_{12}$ and linked to the array of a program switch shown in FIGS. 7 ... 7c. This program switch has 8 parts. Each works so that the array of contacts is brought in 4 or 5 positions for a summation operation. $PS_2$ and $PS_2$ in FIG. 7 results in $G_0$, $G_2$, $G_4$, $G_6$ and $G_8$, in $G_1$, $G_3$, $G_5$, $G_7$ and $G_9$. In the same way $PS_3$ and $PS_4$ in FIG. 6c result in $U_0 \ldots U_7$ ($U_9=0$). Also in FIGS. 7b and 7c $PS_5$ and $PS_8$ result in $\bar{U}_1 \ldots \bar{U}_9$ ($\bar{U}_0=0$) and $PS_6$ and $PS_7$ result in $\bar{G}_1 \ldots \bar{G}_8$ ($\bar{G}_0=\bar{G}_9=0$). The sums G, U, $\bar{G}$, and $\bar{U}$ are stored and linked to the contacts of the collector switches $S_{13} \ldots S_{16}$ in FIGS. 8 and 8a. Going on in the example we are now able to compute the periodic coefficients $a^*$ and $b^*$ according to the formulas given in Equations 19 ... 19e and 20 and 20a. As an essential part in the summation pairs of equally indexed G's and U's, $\bar{G}$'s and $\bar{U}$'s have to be combined in addition and in subtraction. FIG. 8 shows a pair of collector-switches both in phase and synchronism. Collecting all G's and U's in one revolution these values are linked to 2 inputs of the left Adder, while the U's in parallel are converted in their polarity and with the G's linked to 2 inputs of the right Adder. According to Equations 19 and 20 a sum combination of the original samples $y_9$, $y_{18}$ and $y_{27}$ has to be added to get the periodic coefficients. These samples are available from the switch contacts of switch $S_1$ on FIG. 3 and it is evident from earlier descriptions how to get the combinations $\pm(y_9 \pm y_{27})+y_{18}$ and so on. These combinations are linked to contact groups of the collector switches $S_{17}$ and $S_{18}$ in FIG. 8. These collector switches are in phase and synchronism with the upper ones and their outputs are linked to the third input of the Adders. During one revolution of the collector switches and Adders deliver the $a^*$ coefficients to sampler switches $S_{21}$ and $S_{22}$ in FIG. 9. FIG. 8a in which the automatic computation of the $b^*$ coefficients is shown is evident from the preceding description. The results are linked to the sampler switches $S_{23}$ and $S_{24}$ in FIG. 8. The periodic phase angles $\phi_m^* = \mathrm{tg}^{-1}(b_m^*/a_m^*)$ and the periodic amplitude coefficients $a_m^* = \sqrt{a_m^{*2}+b_m^{*2}}$ can now be obtained. FIG. 10 shows 2 collector switches with the periodic coefficients $a^*$ and $b^*$ arranged on their contacts. The operation will be done by a Phase Meter and a Root Mean Square Meter respectively which also are well known operators. The resulting phases $\phi^*$ and periodic root mean square amplitudes $A^*$ are distributed by sampler switches $S_{27}$ and $S_{28}$.

Figure 11:
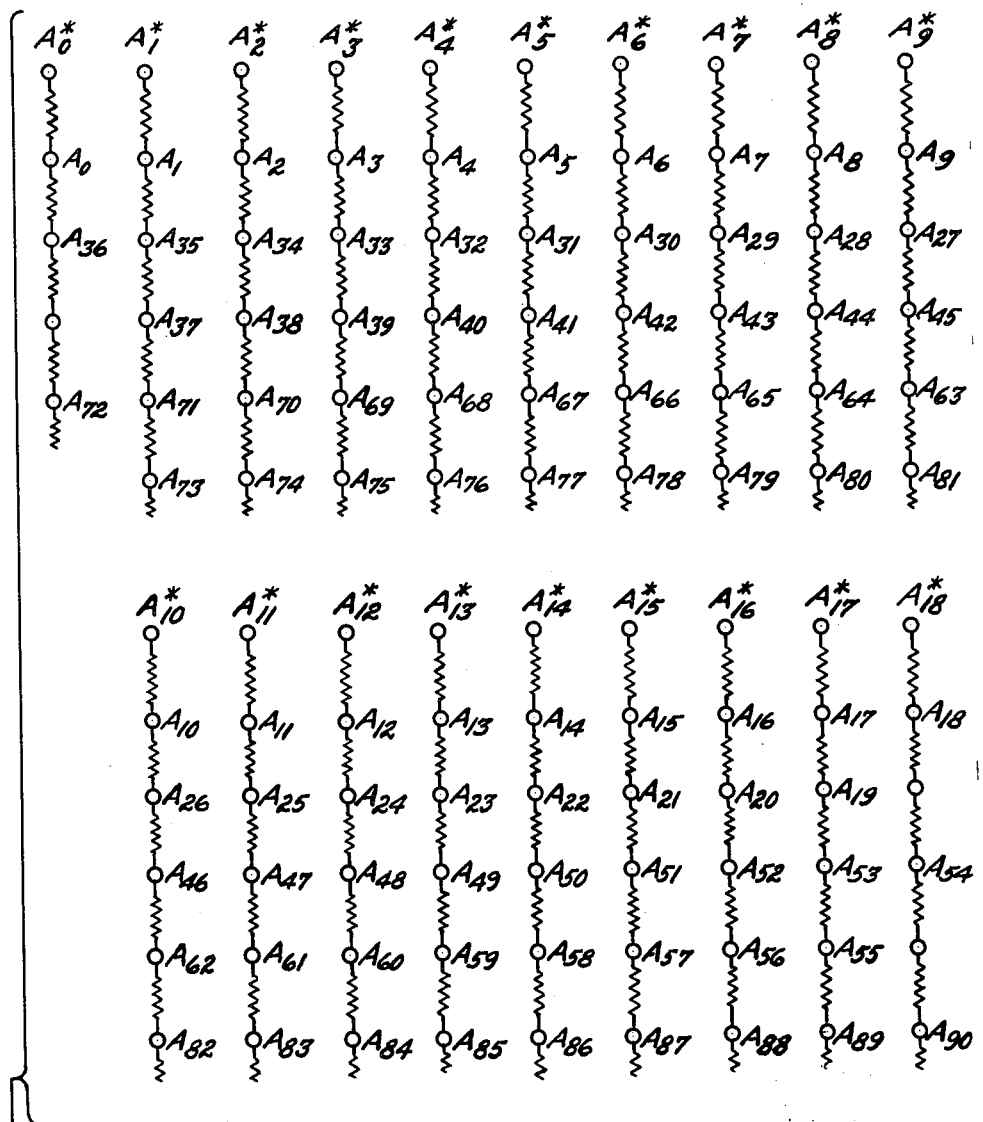
FIGURE 11 illustrates the attenuator stage of the invention.

Nothing further must be done to get the natural phases $\phi$ since they are identical to the periodic ones. To get the natural amplitudes from the periodic ones the periodic coefficients $A^*$ have to be multiplied by real values resulting from the Table of Factors. But, since these values again are smaller than 1, the multiplication again can be performed by resistor potentiometer or attenuators with proper tapping. The periodic amplitudes are linked to such attenuators as shown in FIG. 11. Each attenuator has its own tapping resulting from the Table of Factors. The other end has ground potential of course. It can be tapped as high as wanted. In FIG. 11 all natural amplitudes up to the 90th can be received. If the natural coefficients $a_m$ and $b_m$ are wanted, the collector switches $S_{25}$ and $S_{26}$ in FIG. 10 are linked directly to the potentiometers in FIG. 11. In both cases the final result appears at the taps of the potentiometers shown in FIG. 11 and can be visualized in any known method.

The foregoing circuit elements described in detail above, while suitable for one embodiment of the invention are to be taken as suggestive and not as limiting the invention. It is obvious that digital as well as analog computing apparatus could be used and it is therefore intended that the subject invention cover all such modifications and applications as fall within the scope of the appended claims.

What is claimed is:

1. Apparatus for determining the Fourier coefficients of a nonsinusoidal periodic function comprising function sampling means for selecting sample values of the function, computing means for grouping said sample values for storage in accordance with their common harmonic orders, and means for multiplying said groups of sample values by real number factors corresponding to tabulated values derived from sinusoidal values of the number of Fourier coefficients desired and the number of sample values taken.

2. A Fourier analyzer comprising the combination of wave period recognizing means, wave sampling means coupled directly to said period recognizing means for selecting sample values of the wave, computing means for converting said sample values into signals representative of said values, switching means for grouping sample values of the wave according to their common harmonic orders, potentiometer means for multiplying said groups by real number factors corresponding to the number of sample values taken, and means for deriving from said potentiometer means the desired Fourier coefficients.

3. A Fourier analyzer comprising the combination of a wave period recognizer, means for sampling the amplitude of said wave at equal time intervals, means for collecting sample amplitude values which are related to intercorrelated harmonic orders of component sinusoidal waves, means for multiplying the collected values by real number factors which are a function of the number of sample values taken, means for grouping such products with their corresponding amplitude sample values to form periodic Fourier coefficients and means for multiplying said periodic Fourier coefficients by number factors which are a function of the number of Fourier coefficients desired, to obtain natural Fourier coefficients.

4. In apparatus of the class described for analyzing wave forms the combination of a sweep oscillator and oscilloscope period recognizing means, a wave form amplitude sampler and storage switch, collector switches and adder means for grouping and storing sample wave form amplitude values according to their common harmonic order, potentiometer means for multiplying grouped sample values by their corresponding periodic real number factors, said real number factors being a function of the number of sample values taken, a third sampler switch coupled directly to said potentiometer means, a program switching array for the purpose or forming sub groups, collector switch and adder means coupled directly to said program switching array for the purpose of combining said sub groups with applicable wave form amplitude samples, sampler and collector switches coupled directly to said adder means, a phase meter and a root mean square meter coupled directly to said last-mentioned sampler and collector switches, and attenuator means for deriving the desired natural Fourier coefficients.

5. Apparatus for automatically performing a Fourier analysis consisting of a period recognizing means, a sampler switch for taking and storing wave form amplitude values at a number of equal time intervals during one period of the wave to be analyzed, a first grouping stage for collecting intercorrelated amplitude values in accordance with the invention, a multiplier stage for multiplying the groups obtained from the first grouping stage by real number factors which real number factors are a function of the number of sample values taken, a second grouping stage wherein products obtained from the multiplier stage are grouped with applicable amplitude values from the sampler switch stage to form periodic Fourier coefficients, and an attenuator stage which derives the desired natural Fourier coefficient from corresponding periodic Fourier coefficients.

6. Apparatus according to claim 5 further including a phase meter disposed between said second grouping stage and said attenuator stage for the purpose of determining the corresponding phase angle of any component wave.

7. Apparatus according to claim 5 further including a root mean square meter disposed between said second grouping stage and said attenuator stage for the purpose of determining the D.C. component of any component sinusoidal wave.

8. Apparatus according to claim 5 in which said period recognizing means comprises an oscilloscope having a sweep generator connected to its $y$ plates and the nonsinusoidal function to be investigated is connected to its $x$ plates.

9. Apparatus according to claim 8 in which said first grouping stage consists of collector switches, phase converters, adder means and sampler switches connected in such a manner as to group sample amplitude values in accordance with their relationship to the intercorrelated harmonic orders of component sinusoidal waves.

10. Apparatus according to claim 9 in which said multiplier stage consists of a collector switch, a potentiometer and a sampler switch connected in such an arrangement as to multiply the values obtained from the first grouping stage by their corresponding real number values.

11. Apparatus according to claim 10 in which said second grouping stage comprises a program switch array, collector switches, phase converters, and adder means arranged to group the products of said multiplier stage with sample values from said sampler switch to obtain periodic Fourier coefficients.

12. Apparatus according to claim 11 in which said attenuator stage consists of collector switches and potentiometer means whereby the periodic Fourier coefficients are multiplied by applicable number factors to provide the natural Fourier coefficients.

References Cited in the file of this patent

UNITED STATES PATENTS

| | | |
|---|---|---|
| 2,752,092 | McDonal | June 26, 1956 |
| 2,851,661 | Buland | Sept. 9, 1958 |
| 2,866,899 | Busignies et al. | Dec. 30, 1958 |
| 2,934,708 | Stuntz | Apr. 26, 1960 |